July 28, 1959   E. A. J. MOL   2,896,253
SCREW FOR HANDLING THERMOPLASTIC RESINS
Filed Jan. 17, 1957   2 Sheets-Sheet 1
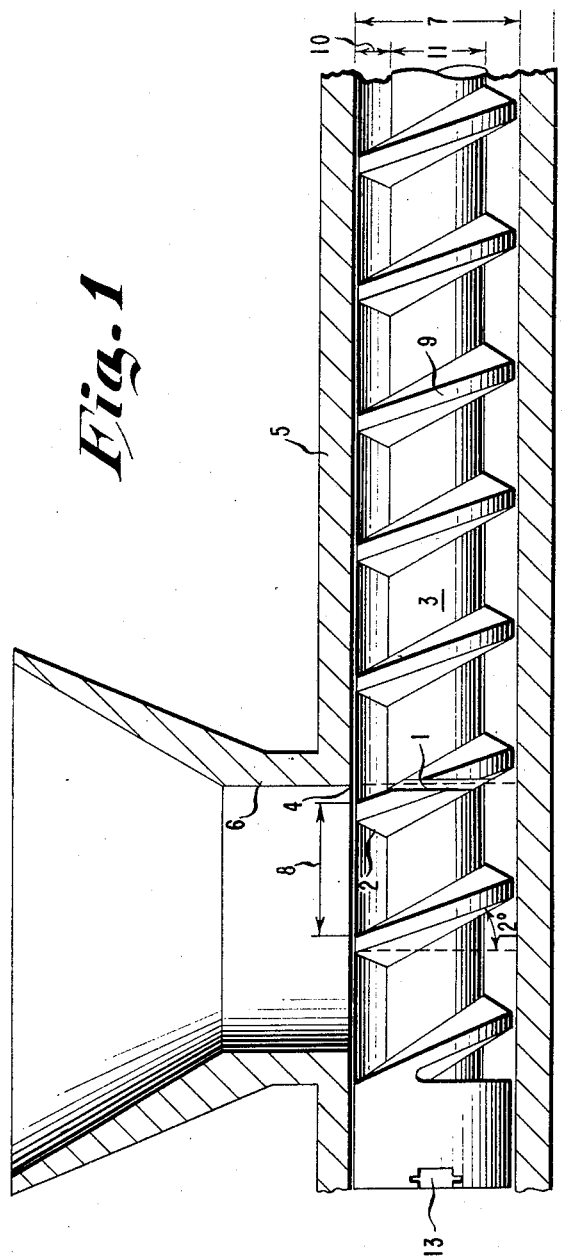
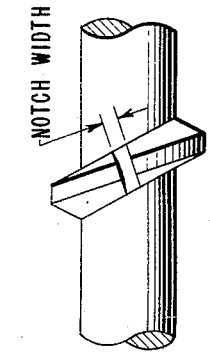
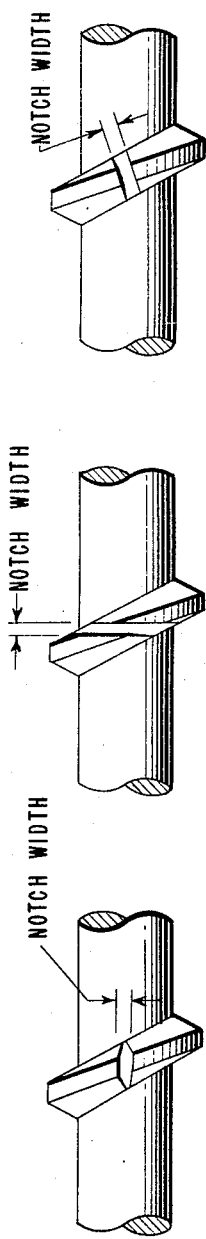
INVENTOR
E. A. J. MOL
BY Earl L. Tyner Jr.
ATTORNEY July 28, 1959 E. A. J. MOL 2,896,253
SCREW FOR HANDLING THERMOPLASTIC RESINS
Filed Jan. 17, 1957 2 Sheets-Sheet 2
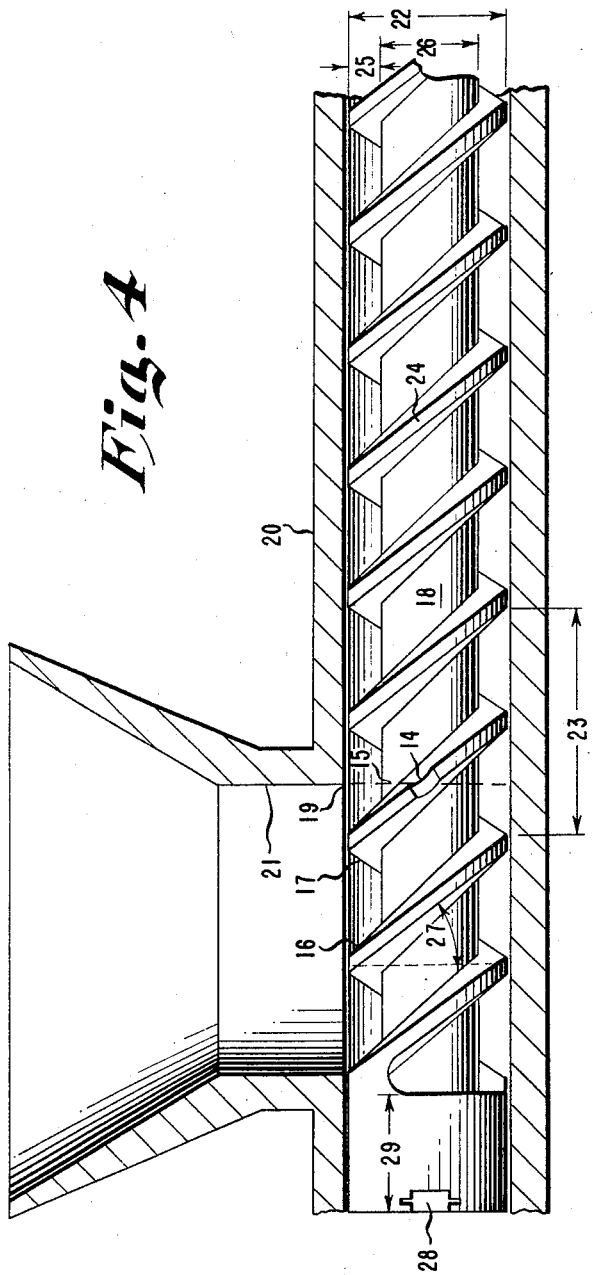
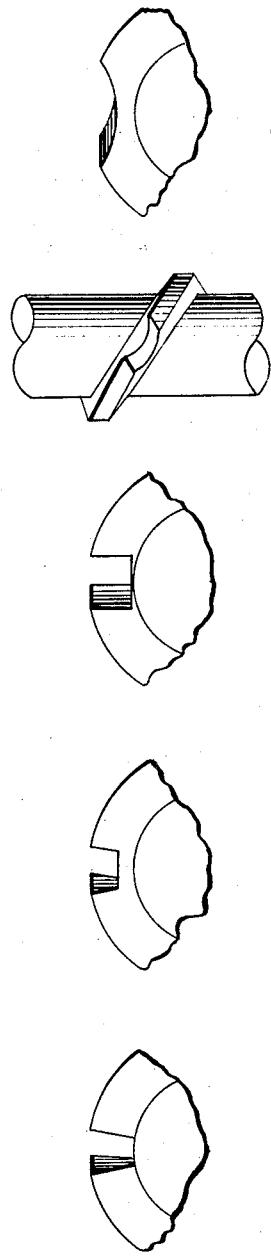
INVENTOR
E. A. J. MOL
BY Earl L. Tyner, Jr.
ATTORNEY

United States Patent Office 2,896,253
Patented July 28, 1959

2,896,253

SCREW FOR HANDLING THERMOPLASTIC RESINS

Evert Ary Jan Mol, Fort Wayne, Ind., assignor to E. I. du Pont de Nemours and Company, Wilmington, Del., a corporation of Delaware Application January 17, 1957, Serial No. 634,654

4 Claims. (Cl. 18—12)

This invention relates to a novel screw for use in processing thermoplastic resins, and, more particularly, it relates to an extrusion screw in which the flights of the transport section of the screw each have a notch cut out at a point near the feed hopper.

It has long been observed in the operation of devices for the plastication, mixing, and extrusion of thermoplastic resins that, with continuing operation, power requirements will periodically increase and output simultaneously decrease. One result of this periodic change in output is that the thermoplastic extrudate will vary in size and shape so that an unsatisfactory product will result. Eventually, particularly with hard thermoplastics such as nylon, there may sometimes result a complete jamming of the screw which necessitates a costly and time-consuming shutdown to clean out the barrel and screw of the machine. Examination of such jammed screws has shown that pellets of the plastic have become caught, squeezed, and flattened between the flights of the screw and the cylindrical walls of the barrel. It is apparent that these jammed pellets caused increased friction and heating with the result that increased power was required to turn the screw. More careful examination has revealed that these pellets, as they softened and flattened out, tended to stick to each other and to other pellets within the grooves of the screw, thus building up aggegates which would not move forward freely along the barrel. Such aggregates would act to restrict, and sometimes to prevent altogether the forward transport of the thermoplastic pellets toward the melting zone of the machine.

Various methods have been tried in the past to overcome the serious effects of this phenomenon. Thus in U.S. Patent 2,422,722 to Frederick J. Fielitz there is described a device for attachment to the forward edge of the hopper to provide a zone of varying cylindrical diameter in which some of the caught, squeezed pellets might become disengaged. In U.S. Patent 2,671,930 to Jacob C. F. Kessler, Johannes Boetje, and Johann F. Kohlway there is described a device for attachment to the wall of the hopper to provide a scraping action along the surfaces of the flights of the screw. However, even with the use of such complicated devices, it has been found that many of the thermoplastic pellets become caught between the forward edge of the hopper opening and the moving screw flight so that the problems of fluctuation of output and jamming of the screw have not been eliminated. Furthermore, these devices have the disadvantage of partially blocking the opening between the hopper and the transport screw, thus restricting seriously the maximum throughput of the machines.

An object of this invention is to provide an improved means of transporting pellets or chips of thermoplastic resins from a reservoir, such as a gravity-feed hopper, along a cylindrical barrel to the melting zone of a machine for continuously working, mixing, and extruding of the thermoplastic resin. Another object of this invention is to provide an improved screw which will deliver such thermoplastic resin pellets at a uniform rate from the hopper along the cylindrical barrel of a machine such as a plasticator or an extruder and which will eliminate the periodic decline in throughput and increase in power requirements with time often encountered in the operation of such machines. Still other objects of this invention will become apparent from the descriptions of the construction and operation of this invention which are provided in the following specifications and examples.

The objects of this invention are accomplished by an apparatus for receiving, transporting, melting, working, and extruding thermoplastic pellets, by means of a screw motion, comprising a screw, a barrel located concentrically around the outside of said screw, and means for rotating said screw with respect to said barrel, a feed hopper attached to a passageway from the outside of said barrel to the inside of said barrel, through which said thermoplastic pellets may be fed to said screw, said screw consisting of a section for transporting and melting said thermoplastic pellets and a section for working and compressing the plastic and forcing it through screen packs and dies, the configuration of said screw being characterized in that a portion of each flight of the aforementioned transport section of the screw contains a notch at the point where said flight contacts the meeting point of said barrel with the forward edge of said hopper, said notch being generally concave and extending through the entire width of said flight and having dimensions such that, in a radial direction with respect to said screw, the notch is at least as deep as the largest dimension of said thermoplastic pellets and, in a direction measured along the outer face of the flight, said notch is at least as wide at its widest point as the largest dimension of said thermoplastic pellets but not wider than 15% of the circumference of said screw.

Figure 1 is a cross-sectional view taken on the axis of a screw which shows the transport section of a screw in place inside a barrel with a notch cut out of the flight at the intersection of said flight with the vertical projection of the forward edge of the hopper.

Figure 2a is a plan view along axis of the screw illustrating a flight having a notch with its sides cut parallel to the axis of the screw.

Figure 2b is a plan view of the screw illustrating a flight having a notch with its sides cut perpendicular to the axis of the screw.

Figure 2c is a plan view of a notch similar to that of Figures 2a and 2b except that the sides are cut at an acute angle to the axis of the screw.

Figures 2d, 2e, and 2f are fragmentary cross-sectional views of a portion of the flight showing several possible configurations of the notches of Figures 2a, 2b, and 2c.

Figure 3a is a plan view along axis of screw in which a semi-elliptical notch is cut from the flight.

Figure 3b is a cross-sectional view of the screw in which a semi-elliptical notch corresponding to that in Figure 3a is cut from the flight.

Figure 4 is a cross-sectional view similar to Figure 1 except that the transport section has more than one flight with a notch cut from each flight where that flight meets the juncture of the forward edge of the hopper and the barrel.

Although this is not essential to the embodiment of this invention, the preferred material of construction is an alloy steel (e.g. "Elastuf" A–2), a stainless steel (e.g. type 410) or a cold-rolled steel (e.g. SAE 4140).

In Figure 1, at the point 1 where the screw flight 2 of the feeding section of the screw 3 contacts the meeting-point 4 of the cylindrical barrel 5 and the forward edge of the hopper 6 a small notch is cut out of the screw flight. The width and depth of this notch will be determined by the maximum dimension of the thermoplastic pellets which are to be transported by the screw. Said notch must be at least as wide and at least as deep as this maximum dimension of the thermoplastic pellets. In the preferred embodiment of this invention, this notch will be from 100%–300% as wide and deep as this aforesaid maximum dimension. However, where the diameter of the screw is relatively large, as compared with the size of the thermoplastic pellets, said notch should not be greater than 15% of the circumference of the screw-flight, and preferably it should be 2% to 6% of this circumference. The depth of the notch will generally be limited to the depth of the screw flight but may be less than this where the depth of flight is greater than the maximum dimension of said thermoplastic pellets. The shape of the notch is not critical since any generally concave shape is satisfactory. The sides of the notch may be cut parallel, perpendicular, or at an acute angle with respect to the axis of the screw as illustrated in Figures 2a, 2b, and 2c; the perpendicular art illustrated in Figure 2b is preferred. Equally well the cut may be semi-elliptical, as illustrated in Figures 3a and 3b, provided that the minimum radius of the ellipse is at least as great as the maximum dimension of the thermoplastic pellets which it is desired to transport with the screw; generally U-shaped notches will function equally well. The maximum diameter 7 of the screw, pitch 8 of the screw flights, flight width 9, depth 10 of the screw flights, and total length of the screw are immaterial to the embodiment and operation of this invention. However, the clearance between the outside diameter of the flights of the screw and the barrel walls generally must be from 0.001 inch to 0.003 inch per inch of barrel diameter, and the helix angle of the flights of the transport section should be between 10° and 30°. Furthermore, the screw may have a single lead, as illustrated in Figure 1, or it may have two or more leads as illustrated in Figure 4. Where the screw is constructed of multiple leads, a similar notch is cut in the flight of each lead where that screw-flight will contact the point 4 of Figure 4.

It is possible to employ this invention in various types of machines for plasticating, working, and extruding the thermoplastic resin into various shapes, forms, and articles of commerce. The construction of the screw beyond the transport region will depend upon the operation which is to be performed upon the thermoplastic resin. Generally there will be a melting zone where the thermoplastic is converted into a fluid either by heat supplied through the walls of the cylindrical barrel, or by heat generated by mechanical working of the thermoplastic resin, or by a combination of both means. Beyond the melting zone there may be an extrusion zone where the compacted, fluid resin is forced, by the action of the screw, through various screen packs and dies to form filaments, rods, tubes, sheets, or wire coverings as desired.

This invention is further described and explained in the following examples which serve to illustrate specific embodiments and operation of the invention:

*Example 1*

In one particular embodiment of this invention, a transport screw 30 inches long was constructed of an alloy steel ("Elastuf" A–2). The extruder was similar to that shown in Figure 1, the maximum diameter of the screw 7 being 1.991 inches, and the cylindrical barrel being 2.000 inches in diameter. The flight pitch 8 was 2 inches, giving a helix angle (12) of 17.7°, the flight width 9 was 0.200 inch, the depth of flight 10 was 0.250 inch, and the root diameter 11 was 1.491 inches. At the point 1 where the screw flight, with the screw in operating position within the cylindrical barrel would contact the point 4, a notch 0.250 inch wide and 0.250 inch deep was cut out of the screw flight. The bottom of the notch was cut concentrically with the root of the screw and the sides of the notch were cut perpendicular to the axis of the screw, resulting in a notch shown in Figure 2b and 2d.

Said screw, constructed as described hereinabove, was inserted in a 30-inch long cylindrical barrel 5 and fastened in place by means of a coupling at 13 to a variable speed drive.

This screw was started rotating at 40 revolutions per minute. The hopper was charged with commercial nylon resin pellets having a parallelepiped shape; the size of these pellets was 0.125 by 0.125 by 0.250 inch. This assembly was operated without application of heat and with no die on the end of the barrel so that throughput could be determined by collecting the solid nylon pellets at the exit end of the cylindrical barrel. The output of this screw under these conditions averaged 6.5 grams per revolution, varying between 5.0 and 7.5 grams per revolution. It was observed that no nylon pellets were caught between the forward edge of the hopper opening and the moving screw flight. A few pellets were temporarily trapped at the side edge of the hopper opening but moved forward over the flight into the cut-out notch and were released at this point. Thus no build-up of jammed, aggregated, particles occurred, there was no heat buildup, and power requirements and throughput remained quite constant.

By way of comparison and contrast, a screw constructed according to identical specifications but without the feature which defines this invention, that is, without a notch cut out from the screw flight, was installed in the same cylindrical barrel and operated in the same manner, employing the same type of nylon pellets. In this case, the initial delivery rate again was about 6.5 grams per revolution. However, at the end of five minutes' operating time, the output had fallen to less than 1.0 gram per revolution and the power requirements to turn the screw had substantially increased. As operation was continued sudden increases in output occurred periodically, followed by similar declines until the machine finally was almost jammed. The jammed machine was dismantled, and it was found that numerous pellets of nylon were squeezed and flattened between the screw-flight and the barrel. Several aggregates of flattened pellets were found which could have effectively blocked transport of the nylon pellets along the barrel.

*Example 2*

In another particular embodiment of this invention, an extrusion screw 36 inches long was constructed of alloy steel ("Elastuf A–2"). The diameter of the screw was again 1.991 inches, and the first 30 inches from the rear toward the front (exit end) of the screw was constructed exactly as described for the transport screw of Example 1 including the point of invention, a notch 0.250 inch wide and 0.250 inch deep cut from the flight at the point 1 of Figure 1 with the same configuration as the notch described in Example 1. In the final 6 inches of the screw the depth of flight was decreased from 0.250 inch to 0.060 inch, the decrease being made in a uniform manner over one turn of the flight. The flight pitch was maintained at 2 inches.

This screw was inserted in a 40-inch long cylindrical barrel with an internal diameter of 2,000 inches; it was fastened in place by means of a coupling to a variable speed drive at the rear. The barrel was provided with means for heating it electrically along its full length. Means were provided for circulating chilled water to cool the neck of the hopper where it entered the heated cylindrical barrel. At the forward end of the barrel, means were provided for attaching, interchangeably, dies for forming the extruded thermoplastic resins into various shapes and forms.

In the first experiment with the machine described above, a die for forming the extruded resin into a ⅝ inch rod was attached to the end of the extrusion barrel, together with appropriate screen packs. The screw was started turning at 50 revolutions per minute, and the hopper was charged with the commercial nylon resin described in Example 1. The extruded rod of nylon was quenched in a water bath as it came from the die, and was then transported at a constant rate by means of passage through pinch rolls to a cutter where it was cut into standard lengths. The rate of extrusion remained constant over the periods of operation (four hours or longer) and the diameter of the extruded rod never varied by more than 4% from the average value, ⅝ inch.

By way of comparison and contrast, an extrusion screw identical with the above but lacking the point of invention, that is, without a notch cut out of the flight, was operated in the same barrel under identical conditions with the same type of nylon thermoplastic resin. The extrusion rate rapidly fell to about 80% of that obtained with the use of the screw embodying the disclosed invention. The diameter of the extruded rod obtained with this screw varied by about ±20% from the average during each minute of operation. During an extended extrusion run with this screw, the screw nearly jammed on two occasions; at these times, the extruded rod dwindled to a mere filament or broke off entirely.

Analogous, comparative results were obtained with the two screws described above when, instead of a rod die, a die for the production of tubes or a die for coating wire with the nylon resin was employed. It was found that the improved uniformity of output obtained by means of this invention was of particularly great value in obtaining a uniform coating of the resin on wire.

*Example 3*

In another specific embodiment of this invention, a larger screw was constructed for extruding thermoplastic resins. The transport section of said screw was 40 inches long. As illustrated in Figure 4, the maximum diameter 22 of said screw was 3.992 inches for use in a cylindrical barrel having a 4.000 inch inside diameter. Said transport section of said screw was constructed with two leads, 16 and 17. The flight pitch 23 of the aforesaid leads was 5 inches, giving a helix angle (27) of 21.7°. The flight width 24 was made 0.400 inch and the flight depth 25, 0.875 inch. The root diameter 26 was 2.270 inches. At the points 14 and 15 where said screw flights, with said screw in operating position within the aforesaid cylindrical barrel, would normally contact the projection of point 19 of the forward edge 21 of the hopper-opening, semi-elliptical notches 0.600 inch wide and 0.250 inch deep, at the minor radius of the ellipse, were cut out of said screw flights, as illustrated in Figures 3a and 3b, which shows a perspective view and a cross-sectional view, respectively, of the aforesaid notch as cut from one flight of the screw. The sides of the notch were cut at about 45° to the axis of the screw as indicated in Figure 2c.

Beyond the transport section of the screw, the depth of flight of the screw was decreased to 0.200 inch, the decrease being made in a uniform manner over one turn of the flights (5 inches). The flight pitch was maintained at 5 inches for the remainder of the length of the screw (15 inches). The total flighted length of the screw was 60 inches.

The overall length of the screw described was 6 feet, including butt (29) and point. This screw was placed in a cylindrical barrel of equal length having an internal diameter of 4.000 inches. Said screw was fastened by means of bolts at point 28 to a variable speed drive mechanism. Means were provided to heat the entire length of the barrel electrically by use of three separately controlled, cylindrical band heaters. Means were provided to cool the hopper where it entered the cylindrical barrel to prevent softening and sticking of the resin in the hopper. At the forward end of the barrel, means were provided for the attachment of screen packs and any one of a number of interchangeable extrusion dies.

In one particular experiment employing this screw, a standard pipe die for the extrusion of thermoplastic pipe of one inch outside diameter and 0.125 inch wall thickness was bolted to the end of the assembly described hereinabove. The aforesaid screw was operated at 45 revolutions per minute. The hopper of this extrusion apparatus was charged with the commercial nylon resin described in Example 1, and sufficient heat was supplied through the walls of the barrel to melt the nylon resin by the time it reached the section of the screw having the shallower depth of flight. Nylon pipe extruded in this experiment was quenched in cold water and drawn through the quench bath at a constant rate by means of a pinch roll designed for grasping pipe. Production rate remained constant over extended periods of operation. Examination of the nylon pipe which was produced showed that it had a very uniform diameter and wall thickness. The uniformity of this pipe reflected the exceptional uniformity of throughput obtained with this screw.

The above examples are illustrative only, and are not intended as limiting the scope of this invention. Thus it should be obvious that anyone skilled in the art could construct screws with many variations in detail without going beyond the scope and intent of this invention. Obviously the length and the diameter of the screw can be varied over a wide range, the number of leads and the pitch and depth of the flights of the transport section can be varied, and, in combination with the transport section, there can be incorporated any construction suited to the operations to be performed upon the resin. Furthermore, it is obvious that the point of invention is the construction of a notch in each flight of the transport section of the screw at the place where it will coincide with the points 4 or 19 of Figures 1 and 4, respectively. The size of the notch is limited only as disclosed hereinabove. The shape of the notch is not particularly important, being generally concave as illustrated in Figures 2a, 2b, 2c, 2d, 2e, 2f, 3a and 3b. The shape could equally well be a U-shape, provided only that dimensions of width and depth fall within the ranges hereinabove disclosed.

As hereinabove described, this invention completely eliminates the trapping of plastic pellets, in the transport sections of extrusion screws, between the flights of the screws and the walls of the cylindrical barrels. Extrusions of thermoplastic resins carried out with said screws can be continued for unlimited periods of time without heat build-up, without major fluctuations in power requirements, and without fluctuation in transport rate of the plastic pellets with resultant fluctuation in extrusion rate and accompanying fluctuation in the size and shape of the extruded filament, rod, bar, tube, wire covering, or sheet. A further advantage of this invention is that it can be embodied in a simple modification of existing machines with the result that expensive replacements or expensive and complicated modifications of existing machines, which may reduce the capacity of the machines without eliminating the problem, need not be made.

I claim:

1. An apparatus for receiving, transporting, melting, working, and extruding thermoplastic pellets, by means of a screw motion, comprising a screw, a barrel located concentrically around the outside of said screw, and means for rotating said screw with respect to said barrel, a feed hopper attached to a passageway from the outside of said barrel to the inside of said barrel, through which said thermoplastic pellets may be fed to said screw, said screw consisting of a section for transporting and melting said thermoplastic pellets and a section for working and compressing the plastic and forcing it through screen pack and die, the configuration of said screw being characterized in that a portion of each flight of the aforementioned transport section of the screw contains a sole notch contiguous with the point where said flight contacts the meeting point of said barrel with the forward edge of said hopper, said notch being generally concave and extending through the entire width of said flight and having dimensions such that, in a radial direction with respect to said screw, the notch has a minimum depth equal to the largest dimension of said thremoplastic pellets and has a maximum depth equal to the depth of flight and, in a direction measured along the outer face of the flight, said notch has a minimum width at its widest point equal to the largest dimension of said thermoplastic pellets and a maximum width of 15% of the circumference of said screw.

2. An apparatus for receiving, transporting, melting, working, and extruding thermoplastic pellets by means of a screw motion comprising a single-flighted screw, a barrel located concentrically around the outside of said screw, and means for rotating said screw with respect to said barrel, a feed hopper attached to a passageway from the outside of said barrel to the inside of said barrel through which said thermoplastic pellets may be fed to said screw, said screw consisting of a section for transporting and melting said thermoplastic pellets and a section for working and compressing the plastic and forcing it through screen pack and die, the configuration of said screw being characterized in that a portion of the flight of the aforementioned transport section of the screw contains a sole notch contiguous with the point where said flight contacts the meeting point of said barrel with the forward edge of said hopper, said notch being formed by cutting through the entire width and depth of said flight to the root of said screw in a direction perpendicular to the axis of the screw, the bottom of the notch being cut concentrically with the root of the screw and the minimum width of the notch being equal to said maximum dimension of said thermoplastic pellets and the maximum width of said notch being 15% of the circumference of said screw.

3. The apparatus of claim 2 wherein said notch has a maximum dimension of width measured along the outer face of the flight of 2% to 6% of the maximum circumference of said screw.

4. An apparatus for receiving, transporting, melting, working, and extruding thermoplastic pellets by means of a screw motion comprising a multi-flighted screw, a barrel located concentrically around the outside of said screw, and means for rotating said screw with respect to said barrel, a feed hopper attached to a passageway from the outside of said barrel to the inside of said barrel through which said thermoplastic pellets may be fed to said screw, said screw consisting of a section for transporting and melting said thermoplastic pellets and a section for working and compressing the plastic and forcing it through screen pack and die, the configuration of said screw being characterized in that a portion of each flight of the aforementioned transport section of the screw contians a sole notch contiguous with the point where said flight contacts the meeting point of said barrel with the forward edge of said hopper, said notch being formed by cutting through the entire width and depth of flight to the root of said screw in a direction perpendicular to the axis of the screw, the bottom of the notch being cut concentrically with the root of the screw and the minimum width of the notch being equal to said maximum dimension of said thermoplastic pellets and the maximum width of said notch being 15% of the circumference of said screw.

References Cited in the file of this patent

UNITED STATES PATENTS 2,680,879    Schnuck et al. _____ June 15, 1954